US012121906B2

United States Patent
Maron et al.

(10) Patent No.: US 12,121,906 B2
(45) Date of Patent: Oct. 22, 2024

(54) OBJECTIVE FUNCTION FOR AUTOMATIC CONTROL OF A MINERAL ORE GRINDING CIRCUIT BASED ON MULTIPLE SIZE MEASUREMENTS OF THE FINAL GROUND PRODUCT SIZE FROM HYDROCYCLONE CLASSIFIER OVERFLOW STREAMS

(71) Applicant: CiDRA CORPORATE SERVICES LLC, Wallingford, CT (US)

(72) Inventors: Robert J. Maron, Middletown, CT (US); Jaime Sepulveda, Santiago (CL)

(73) Assignee: CiDRA CORPORATE SERVICES LLC, Wallingford, CT (US)

(*) Notice: Subject to any disclaimer, the term of this patent is extended or adjusted under 35 U.S.C. 154(b) by 1070 days.

(21) Appl. No.: 16/982,180

(22) PCT Filed: Mar. 19, 2019

(86) PCT No.: PCT/US2019/022943
§ 371 (c)(1),
(2) Date: Sep. 18, 2020

(87) PCT Pub. No.: WO2019/183073
PCT Pub. Date: Sep. 26, 2019

(65) Prior Publication Data
US 2021/0023570 A1 Jan. 28, 2021

Related U.S. Application Data
(60) Provisional application No. 62/644,672, filed on Mar. 19, 2018.

(51) Int. Cl.
*G05B 99/00* (2006.01)
*B02C 25/00* (2006.01)
(Continued)

(52) U.S. Cl.
CPC ............ *B02C 25/00* (2013.01); *B04C 11/00* (2013.01); *G05B 19/0426* (2013.01); *G05B 2219/2616* (2013.01); *G05B 2219/2627* (2013.01)

(58) Field of Classification Search
CPC .............................................. G05B 2219/2627
See application file for complete search history.

(56) References Cited

U.S. PATENT DOCUMENTS 5,094,532 A * 3/1992 Trainer ................. G01J 3/4412
356/336
2012/0209550 A1 * 8/2012 Van Der Spek ...... G01N 29/036
702/63
(Continued)

FOREIGN PATENT DOCUMENTS

| WO | WO-2011019823 A1 * | 2/2011 | ............ B04C 11/00 |
| WO | 2014116675 A1 | 7/2014 | |
| WO | 2016127030 A1 | 8/2016 | |

OTHER PUBLICATIONS

International Search Report issued in International Patent Application PCT/US19/22943, mailed Jun. 6, 2019 (2 pages).
(Continued)

*Primary Examiner* — Suresh Suryawanshi
(74) *Attorney, Agent, or Firm* — Ware, Fressola, Maguire & Barber LLP (57) ABSTRACT

A mineral processing system featuring a controller having a signal processor or processing module configured to: receive signaling containing information about a relationship between multiple particle size measurements of different measured particles having different measured particle sizes flowing in a hydrocyclone classifier overflow stream sensed by at least one particle size measurement device arranged on a hydrocyclone classifier overflow pipe of at least one hydrocyclone in a hydrocyclone battery, and about a float-
(Continued)

able fraction that defines a particle size range of different floatable particle sizes of different floatable particles that can be recovered by the at least one hydrocyclone in the hydrocyclone battery; and determine corresponding signaling containing information to control a ground product size of ore having ground particles provided to the at least one hydrocyclone in the hydrocyclone battery, based upon the signaling received.

21 Claims, 8 Drawing Sheets

(51) Int. Cl.
    *B04C 11/00*     (2006.01)
    *G05B 19/042*     (2006.01)

(56) References Cited

U.S. PATENT DOCUMENTS

| | | | |
|---|---|---|---|
| 2013/0153694 A1* | 6/2013 | Held | G05B 15/02 |
| | | | 241/34 |
| 2015/0362418 A1 | 12/2015 | Newton et al. | |
| 2015/0375235 A1 | 12/2015 | Roitto et al. | |

OTHER PUBLICATIONS

Maron et al. "Assessing the benefits of Automatic Grinding Control Using PST Technology for True On-Line Particle Size Measurement", Pr,cemin GEOMET 2017, Aug. 8, 2017, (11 pages).

* cited by examiner

Figure 1: Floatable fraction measurement calculated as the difference between the minimum and maximum floatable particle sizes Figure 2: Particle size distribution calculated from 4 simultaneous size measurements provided by a single PST sensor shown mounted on a hydrocyclone classifier overflow pipe. Also indicated are the calculated P80 at that particular moment, as well as the maximum and minimum that were observed over approximately one hour.

Figure 3: Particle size distribution curve and floatable fraction measurement showing a correlation with other measured parameters of the grinding circuit Apparatus 100, e.g., including a mineral processing system A controller 101 having a signal processor or signal processing module 102 configured at least to receive signaling containing information about a relationship between multiple particle size measurements of different measured particles having different measured particle sizes flowing in a hydrocyclone classifier overflow stream sensed by at least one particle size measurement device arranged on a hydrocyclone classifier overflow pipe of at least one hydrocyclone in a hydrocyclone battery, and about a floatable fraction that defines a particle size range of different floatable particle sizes of different floatable particles that can be recovered by the at least one hydrocyclone in the hydrocyclone battery; and determine corresponding signaling containing information to control a ground product size of ore having ground particles provided to the at least one hydrocyclone in the hydrocyclone battery, based upon the signaling received; and/or provide the corresponding signaling as control signaling, e.g., to control a grinding and classify stage, such as element 14 in Figure 6.

One or more other module/components 104, including input/output components/modules, memory (RAM, ROM, EPROM, etc.), data, control and address busing architecture, etc.

Figure 4

Figure 5A: Mineral extraction processing system (Prior art)

Figure 5B (Prior art)

Figure 6: Classification stage (Prior art)

Figure 7A: CYCLONEtrac™ PST particle sizing sensor mounted on hydrocyclone overflow pipe (Prior art).

Figure 7B: CYCLONEtrac™ PST plant scale installation diagram, e.g., using individual hydrocyclone overflow sensors - aka PST particle sizing sensor (Prior art)

OBJECTIVE FUNCTION FOR AUTOMATIC CONTROL OF A MINERAL ORE GRINDING CIRCUIT BASED ON MULTIPLE SIZE MEASUREMENTS OF THE FINAL GROUND PRODUCT SIZE FROM HYDROCYCLONE CLASSIFIER OVERFLOW STREAMS

CROSS-REFERENCE TO RELATED APPLICATIONS

This application claims benefit to provisional patent application Ser. No. 62/664,672, filed 19 Mar. 2018, which is incorporated by reference in its entirety.

This application is also related to PCT/US16/16721, filed 5 Feb. 2016, and corresponding U.S. Ser. No. 15/541,839, filed 6 Jul. 2017, which claimed U.S. provisional application No. 62/112,433, filed 5 Feb. 2015, which are all incorporated by reference in their entirety.

This application is also related to PCT/US2014/012510, filed 22 Jan. 2014, and corresponding U.S. Ser. No. 14/762,223, filed 21 Jul. 2015, which claimed U.S. provisional application No. 61/755,305, filed 22 Jan. 2013, which are all incorporated by reference in their entirety.

BACKGROUND OF THE INVENTION

1. Field of Invention

This invention relates to a technique for optimizing the performance of cyclones, e.g., operating in a hydrocyclone battery in a mineral extraction processing system, including extracting a mineral from ore.

2. Description of Related Art

In many mineral processing plants, controlling the final ground product size of grinding circuits is key to optimizing plant performance. For decades, available technologies have suffered from limitations due to the need to obtain and transfer slurry samples from the main flow stream and deliver it to the sampling instrument. The sampling instruments themselves have also demonstrated a lack of robustness because they were originally developed for other less demanding applications. This resulted in very poor availability of the sampling instrument, and consequently has greatly limited the ability to use a real-time measurement of ground product size for real-time control of the circuit. Consequently, the development of control strategies has also been limited, and when implemented have relied on only one product size, e.g., the amount of ground product by weight that passes through a sieve screen of a particular size. Typically, 80% passing a particular target size is typically used as a measure of the final ground product, e.g. 80% passing 100 mesh (equivalent to 150 um).

Recently, the assignee of the instant application developed a new particle size measurement technology based on acoustic impact principles, specifically for this difficult mining application, and is referred to by its commercial name Particle Size Tracking" (PST). By way of example, see the assignee's aforementioned patent application serial nos. PCT/US2014/012510 (WFMB no. 712-002.406-1//CCS-0120WO), as well as corresponding U.S. Ser. No. 14/762,223, and U.S. provisional application No. 61/755,305, which are all incorporated by reference in their entirety. The PST system has no moving parts, is extremely robust, requires very little maintenance, and thus provides a particle size measurement signal with very high availability which is essential for a real-time automatic control of a grinding circuit. The PST system provides this measurement on the overflow discharge of individual hydrocyclone classifiers, in contrast to the prior art legacy technology that only provides a signal from an entire group of hydrocyclones. This new PST information also enables new automatic control strategies.

Because of the poor availability of the legacy technologies, and the lack of measurement on individual hydrocyclones, development of real-time control strategies have been mostly limited to using a single particle size, e.g. the P80 size. However, since the assignee's PST system can provide highly reliable multiple product size measurements, it has enabled new control strategies beyond the simple ones that currently use only one product size as an input.

The ground product size is important because the valuable ground ore must be within a particular size range for it to be separated from the waste ore (gangue) and recovered by the froth flotation stage that follows the grinding stage. Thus an objective of the grinding and classification stage is to deliver to the flotation stage the largest fraction of the ground ore as possible that is within the size range that can be recovered by flotation. This is sometimes referred to as the "floatable fraction".

SUMMARY OF THE INVENTION

In particular, and according to some embodiments, the present invention may include, or take the form of, apparatus featuring a controller having a signal processor or processing module configured at least to:

receive signaling containing information about a relationship between multiple particle size measurements of different measured particles having different measured particle sizes flowing in a hydrocyclone classifier overflow stream sensed by at least one particle size measurement device arranged on a hydrocyclone classifier overflow pipe of at least one hydrocyclone in a hydrocyclone battery, and about a floatable fraction that defines a particle size range of different floatable particle sizes of different floatable particles that can be recovered by the at least one hydrocyclone in the hydrocyclone battery; and determine corresponding signaling containing information to control a ground product size of ore having ground particles provided to the at least one hydrocyclone in the hydrocyclone battery, based upon signaling received.

The present invention may also include one or more of the following features:

The signal processor or processing module may be configured to provide the corresponding signaling as control signaling to control a final ground particle size of the ore having the ground particles provided to the at least one hydrocyclone in the hydrocyclone battery.

The apparatus may include the at least one hydrocyclone in the hydrocyclone battery.

The at least one hydrocyclone in the hydrocyclone battery may include multiple hydrocyclones.

The apparatus may include a grinding and classification stage configured to grind and classify the ore into the ground particles having the final ground particle size for providing to the at least one hydrocyclone in the hydrocyclone battery.

The grinding and classification stage may be configured to receive the control signaling and grind and classify the ore into the ground particles having the final ground particle size using a real time automatic control (e.g., a feedback control loop).

The floatable fraction may be determined as a difference between a minimum floatable particle size and a maximum floatable particle size for the at least one hydrocyclone in the hydrocyclone battery.

The relationship may be a statistical relationship, e.g. that depends on a percentage of the multiple particle size measurements that fall within the floatable fraction. The scope of the invention is intended to include using other types or kinds of statistical relationships both now known and later developed in the future.

The apparatus may include the at least one particle size measurement device arranged on the hydrocyclone classifier overflow pipe of the at least one hydrocyclone in the hydrocyclone battery.

The at least one particle size measurement device may include multiple particle size measurement device arranged on the hydrocyclone classifier overflow pipe of the at least one hydrocyclone in the hydrocyclone battery.

The at least one hydrocyclone in the hydrocyclone battery may include multiple hydrocyclones in the hydrocyclone battery; and each of the multiple hydrocyclones may include a respective hydrocyclone classifier overflow pipe having a respective particle size measurement device arranged thereon.

The apparatus may include a mineral processing system having grinding and flotation stages or circuits.

The signal processor or processing module may be configured to receive further signaling containing information about an objective function or algorithm to maximize a Net Metal Production (NMP) of the mineral processing system; and the signal processor or processing module may be configured to determine the corresponding signaling based upon the further signaling received. The metals may include copper, gold, and other types or kinds of metals.

The objective function or algorithm may be based upon a correlation between the relationship (e.g. between the multiple particle measurements and the floatable fraction) and the NMP of the mineral processing system.

The apparatus may include a memory having an objective function database configured to store a time-elapsed series of correlations between the relationship and the NMP of the mineral processing system.

The signal processor or processing module may be configured to implement the objective function or algorithm and change the floatable fraction, e.g., including changing the particle size range.

The signal processor or processing module may be configured to increase or decrease the particle size range of the floatable fraction, e.g. including increasing/decreasing the difference between the minimum floatable particle size and the maximum floatable particle size for the at least one hydrocyclone in the hydrocyclone battery.

The apparatus may include a memory having a floatable fraction database configured to store floatable fractions and corresponding NMPs of the mineral processing system.

A Mineral Processing System

By way of further example, the invention may take the form of a mineral processing system, featuring a grinding and classification stage, a hydrocyclone battery, at least one particle size measurement device and a controller.

The grinding and classification stage may be configured to receive control signaling and grind and classify ore into ground particles having a ground particle size.

The hydrocyclone battery may include at least one hydrocyclone with a hydrocyclone classifier overflow pipe, configured to receive the ground particles, and provide a hydrocyclone classifier overflow stream from the hydrocyclone classifier overflow pipe having overflow particles with different particle sizes.

The at least one particle size measurement device may be arranged on the hydrocyclone classifier overflow pipe of the at least one hydrocyclone in the hydrocyclone battery, and configured to sense different overflow particles having the different particle sizes flowing in the hydrocyclone classifier overflow stream, and provide particle size measurement signaling containing information about multiple particle size measurements of the different overflow particles having the different particle sizes flowing in the hydrocyclone classifier overflow stream.

The controller having a signal processor or processing module may be configured to:
   receive signaling containing information about a relationship between the multiple particle size measurements of the different overflow particles having the different particle sizes flowing in the hydrocyclone classifier overflow stream, and about a floatable fraction that defines a particle size range of different floatable particle sizes of different floatable particles that can be recovered by the at least one hydrocyclone in the hydrocyclone battery; and
   provide the control signaling containing information to control the ground product size of the ground particles provided from the grinding and classification stage to the at least one hydrocyclone in the hydrocyclone battery, based upon the signaling received.

The mineral processing system may include one or more of the other features set forth herein.

BRIEF DESCRIPTION OF THE DRAWING

The drawing includes FIGS. 1-7B, which are not necessarily drawn to scale, as follows:

In FIG. 2, the graph also indicates the calculated P80 at that particular moment, as well as the maximum and minimum that were observed over approximately one hour.

FIG. 5 showing a mineral processing system in which the present invention may be implemented, according to some embodiments of the present invention, e.g., where

DETAILED DESCRIPTION OF BEST MODE OF THE INVENTION

The Basic Invention

Figure 1:
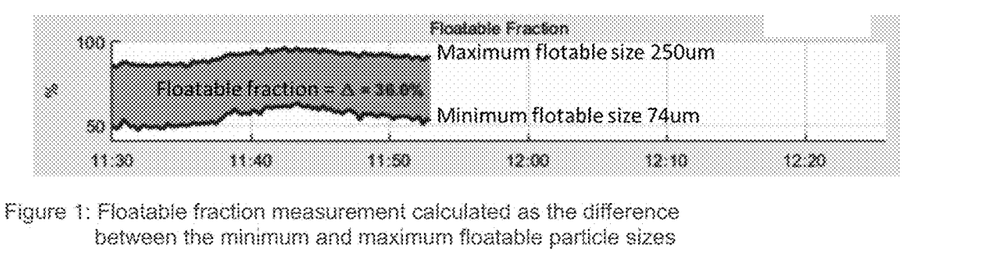
FIG. 1 is a graph of a percentage versus time of a floatable fraction measurement calculated as a difference between minimum and maximum floatable particle sizes, e.g., which may form part of the relationship used to determine the control signaling.

The assignee's PST particle sizing sensor and PST system are capable of measuring and outputting signals for the mass by weight passing or retained by several screen sizes. By properly selecting two of the measurement sizes to represent the minimum and maximum floatable sizes that can be recovered by subsequent froth flotation stage, a real-time measurement of the floatable mass fraction or ore can be obtained for individual hydrocyclones as shown in FIG. 1.

Figure 2:
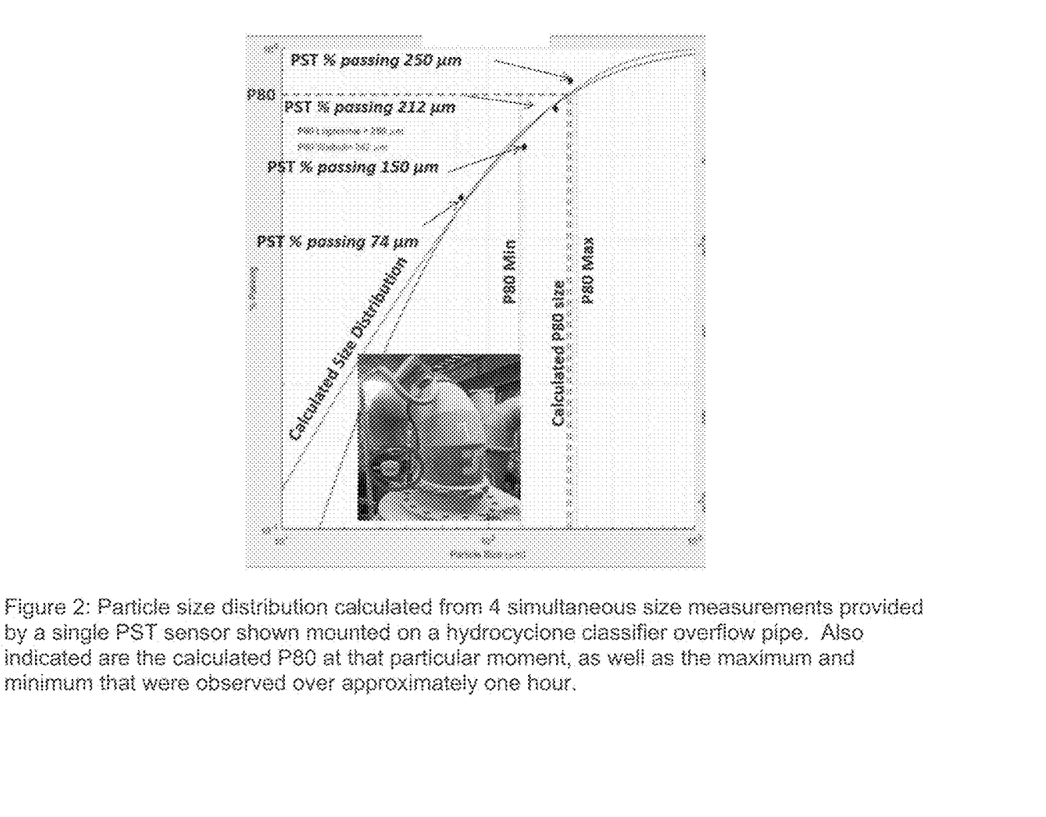
FIG. 2 is a graph of percentage of passing versus particle size, e.g. floatable fraction, showing a particle size distribution calculated from 4 simultaneous size measurements provided by a single PST sensor shown mounted on a hydrocyclone classifier overflow pipe.
Figure 3:
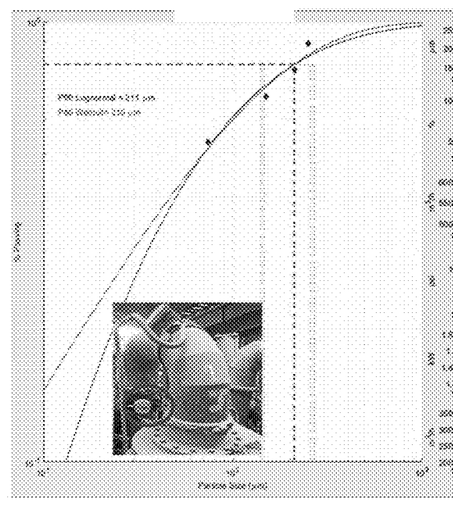
FIG. 3 is a graph of percentage passing versus particle size having particle size distribution curve and floatable fraction measurement, e.g., showing a correlation with other measured parameters of the grinding circuit, such as calculated P80 (FIG. 3A), floatable fraction (FIG. 3B), feed flow to battery (FIG. 3C), battery pressure (FIG. 3D), ball mill power (FIG. 3E), and sump feed water flow rate (FIG. 3F).
Figure 3A:
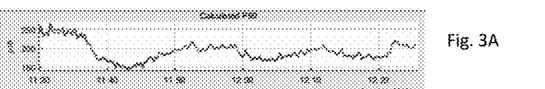
Figure 3B:
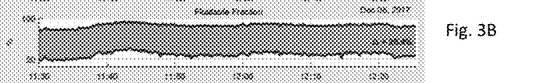
Figure 3C:
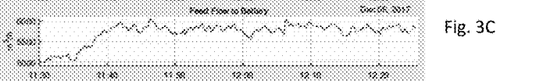
Figure 3D:
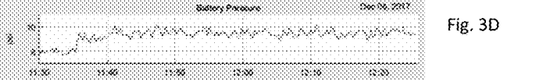
Figure 3E:
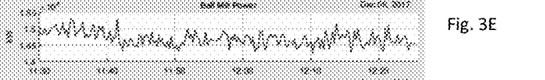
Figure 3F:
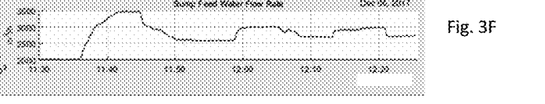

This floatable fraction measurement can be multiplied or otherwise combined with the throughput of the circuit or individual hydrocyclones to produce an objective function or algorithm, e.g., to be maximized by a controller or control system. This new objective function would represent the mass flow rate of floatable mineral delivered to the flotation circuit. Maximizing this objective function would thus maximize the Net Metal Production (NMP) of the grinding and flotation circuits, which is typically the objective of the overall operation. By way of example, FIG. 2 shows the particle size distribution derived from four PST size measurements, and indicates the maximum floatable size (PST % passing 250 microns (um)) and the minimum floatable size (PST % passing 74 um) that were used to create the floatable fraction measurement shown in FIG. 1.

Figure 4:
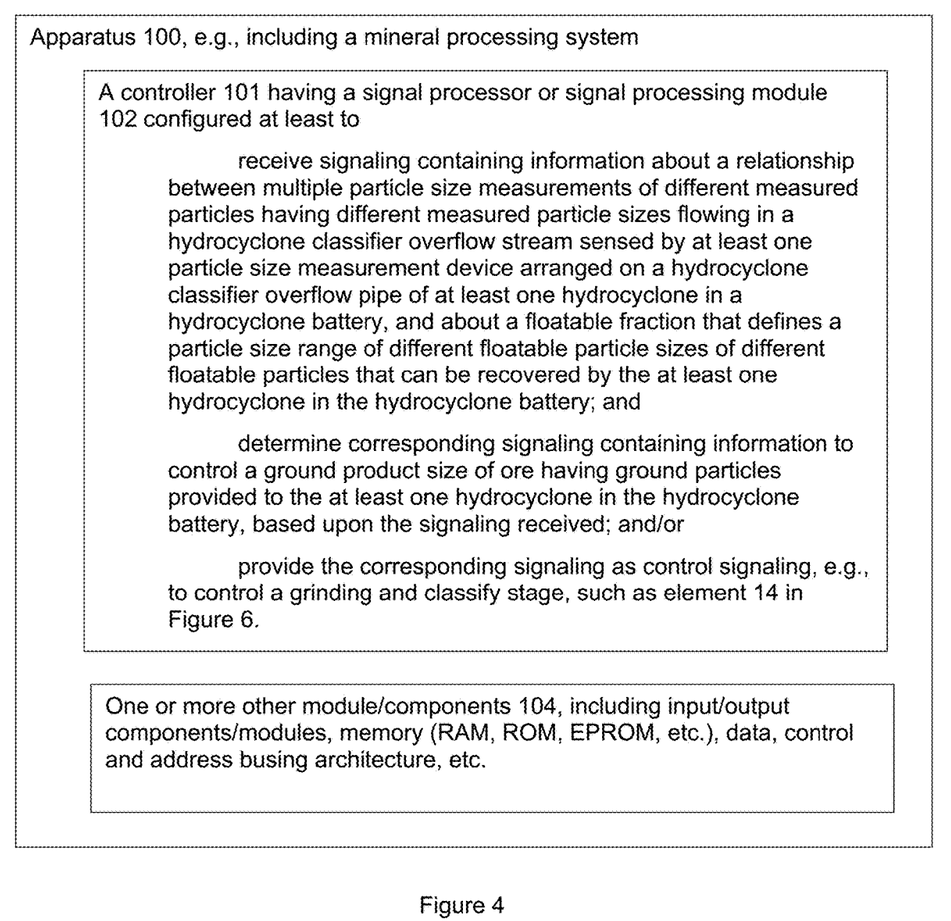
FIG. 4 is a block diagram of apparatus having a signal processor or signal processing module, according to some embodiments of the present invention.

FIG. 4: The Basic Apparatus 100

By way of example, FIG. 4 shows the present invention in the form of apparatus 100 having a controller 101 with a signal processor or processing module 102 for implementing the basic signal processing functionality, according to some embodiments of the present invention. The signal processor or processing module 102 may be configured at least to:
receive signaling containing information about a relationship between multiple particle size measurements of different measured particles having different measured particle sizes flowing in a hydrocyclone classifier overflow stream sensed by at least one particle size measurement device (e.g., see FIG. 7A) arranged on a hydrocyclone classifier overflow pipe (FIG. 7A) of at least one hydrocyclone in a hydrocyclone battery, and about a floatable fraction that defines a particle size range of different floatable particle sizes of different floatable particles that can be recovered by the at least one hydrocyclone in the hydrocyclone battery; and
determine corresponding signaling containing information to control a ground product size of ore having ground particles provided to the at least one hydrocyclone in the hydrocyclone battery, based upon the signaling received.

By way of further example, the controller may form part of a mineral processing system (see FIGS. 5A, 5B and 6), e.g., for extracting a mineral particle of interest like copper or gold from the ore.

Figure 6:
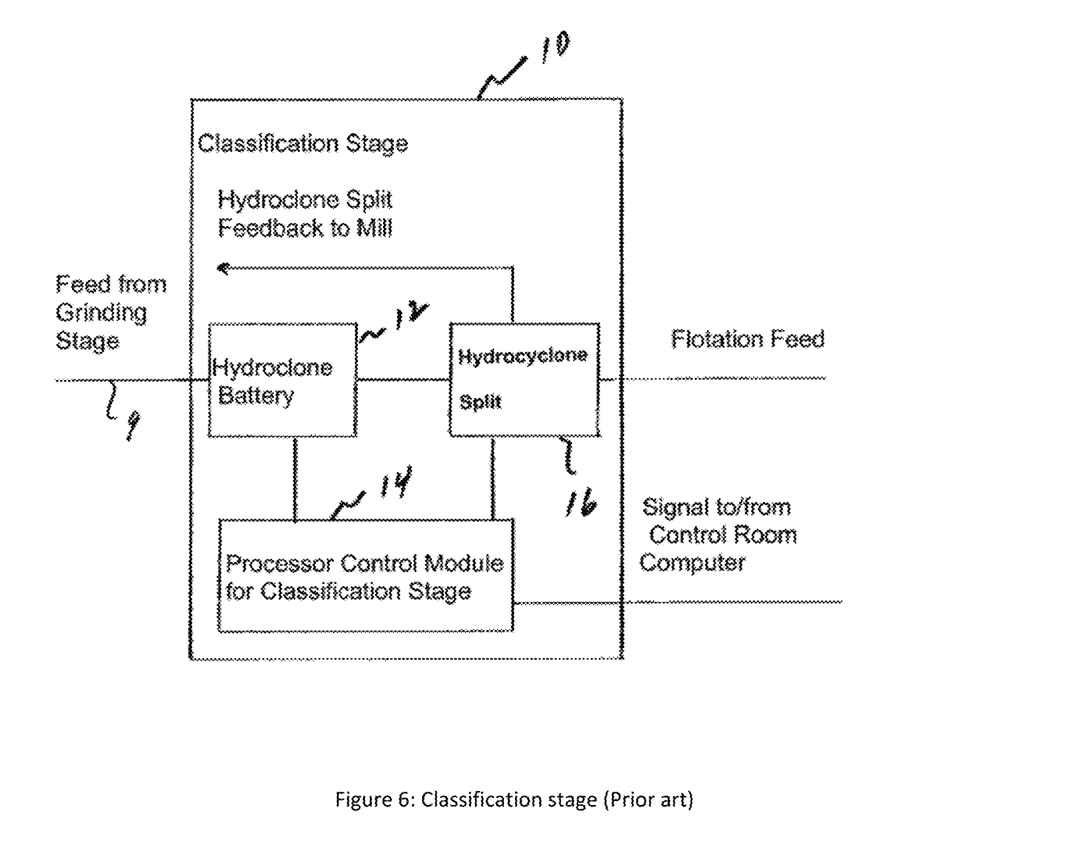
FIG. 6 is a block diagram showing a classification stage that is known in the art.

The signal processor or processing module 102 may be configured to provide the corresponding signaling as control signaling to control a final ground particle size of the ore having the ground particles provided to the at least one hydrocyclone in the hydrocyclone battery 12 (FIG. 6). The control signaling may include, or take the form of, a signal to/from a control room computer, e.g., consistent with that disclosed in relation to FIG. 6.

The signal processor or processing module 102 may be configured to receive further signaling containing information about an objective function or algorithm to maximize a Net Metal Production (NMP) of the mineral processing system, e.g., from a memory, a database or other module/component 104; and the signal processor or processing module 102 may also be configured to determine the corresponding signaling based upon the further signaling received. The objective function or algorithm may be implemented and based upon a correlation between the relationship and the NMP of the mineral processing system.

The apparatus 100 may include a memory (e.g., see element 104) having an objective function database configured to store a time-elapsed series of correlations between the relationship (e.g. between the multiple particle measurements and the floatable fraction) and the NMP of the mineral processing system. The signal processor or processing module 102 may be configured to implement the objective function or algorithm and change the floatable fraction, e.g., including changing the particle size range. The signal processor or processing module 102 may be configured to increase or decrease the particle size range of the floatable fraction, e.g. including increasing/decreasing the difference between the minimum floatable particle size and the maximum floatable particle size for the at least one hydrocyclone in the hydrocyclone battery 12 (FIG. 6). The memory 104 may include a floatable fraction database configured to store floatable fractions and corresponding NMPs of the mineral processing system that may be used and interpreted the objective function or algorithm to maximize the NMP.

Signal Processor or Signal Processing Module 102

By way of example, and consistent with that disclosed herein, the signal processing functionality of the signal processor or processing module 102 may be implemented to receive the signaling, process the signaling, and/or provide the corresponding signaling, using hardware, software, firmware, or a combination thereof, although the scope of the invention is not intended to be limited to any particular embodiment thereof. In a typical software implementation, the signal processor or processing module 102 may include, or take the form of, one or more microprocessor-based architectures having a microprocessor, a random access memory (RAM), a read only memory (ROM), input/output devices and control, data and address busing architecture connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor, device or module 102 as either part of the aforementioned apparatus (e.g., the controller 101), as a stand-alone module, or in the combination with other circuitry for implementing another module.

Techniques for receiving signaling in such a signal processor or processing module 102 are known in the art, and the scope of the invention is not intended to be limited to any particular type or kind thereof either now known or later developed in the future. Based on this understanding, a person skilled in the art would appreciate, understand and be able to implement and/or adapt the signal processor or processing module 102 without undue experimentation so as to receive signaling containing information about the relationship between the multiple particle size measurements of the different measured particles having the different measured particle sizes flowing in the hydrocyclone classifier overflow stream sensed by the at least one particle size measurement device arranged on the hydrocyclone classifier overflow pipe of the at least one hydrocyclone in the hydrocyclone battery, and about the floatable fraction that defines the particle size range of different floatable particle sizes of the different floatable particles that can be recovered by the at least one hydrocyclone in the hydrocyclone battery; and determine the corresponding signaling containing information to control the ground product size of ore having the ground particles provided to the at least one hydrocyclone in the hydrocyclone battery, based upon the signaling received, consistent with that set forth herein.

It is also understood that the apparatus 100 may include one or more other modules, components, processing circuits, or circuitry 104 for implementing other functionality associated with the underlying apparatus that does not form part of the underlying invention, and thus is not described in detail herein. By way of example, the one or more other modules, components, processing circuits, or circuitry may include random access memory, e.g., having one or more databases, read only memory, e.g., having stored computer programs/algorithms, input/output circuitry and data and address buses for use in relation to implementing the signal processing functionality of the signal processor, or devices or components, etc.

Figure 5A:
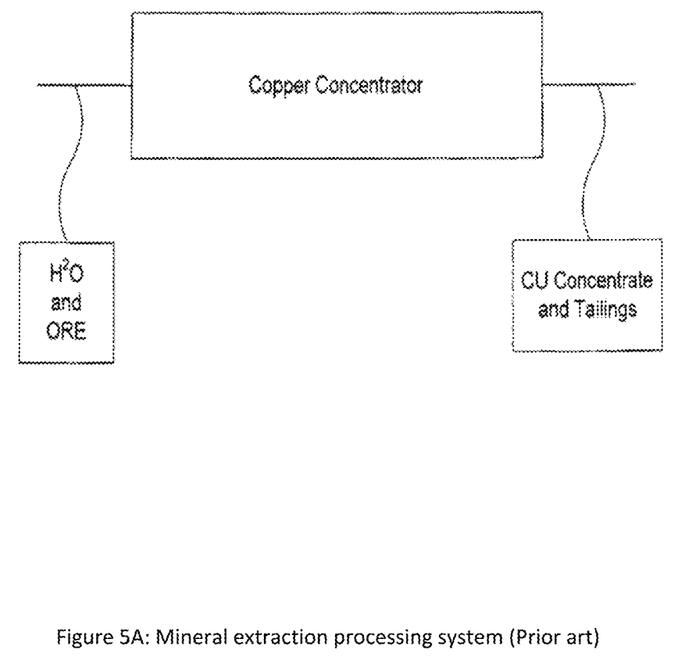
FIG. 5A is a block diagram of a mineral extraction processing system in the form of a copper concentrator that is known in the art.
Figure 5B:
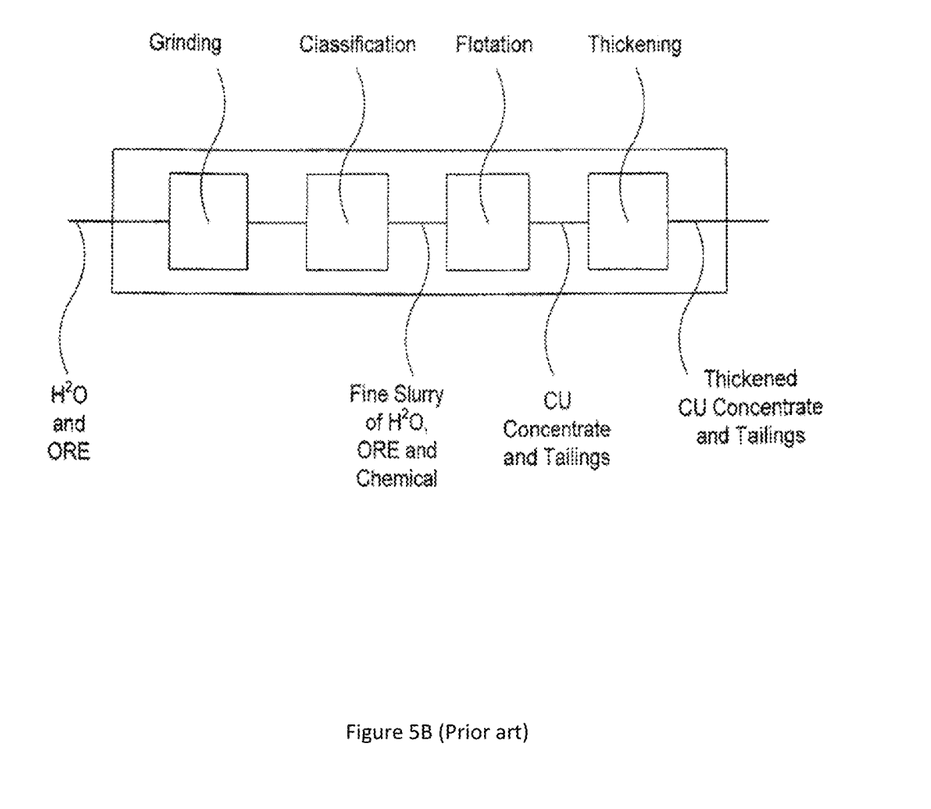
FIG. 5B is a block diagram showing typical processing stages of a mineral extraction processing system that is known in the art.

FIGS. 5A, 5B and 6: The Basic Mineral Processing System

General Background

In many industrial processes the sorting, or classification, of product by size is critical to overall process performance. A minerals processing plant, or beneficiation plant, is no exception. In the case of a copper concentrator as shown in FIG. 5A, the input to the plant is water and ore (of a particular type and size distribution) and the outputs are copper concentrate and tailings. The process consists of a grinding, classification, floatation, and thickening, as shown in FIG. 5B. The grinding and classification stage produces a fine slurry of water and ore, to which chemicals are added prior to being sent to the flotation stage. Once in the flotation stage, air is used to float the copper mineral while the gangue (tailings) is depressed. The recovered copper is cleaned and dried. The tailings are thickened and sent to the tailings pond. The classification stage is critical to the performance of two areas of the process. These areas are the grinding throughput and flotation recovery, grade and throughput.

A grinding operation may include a screens and crusher stage and a mill stage, that is typically configured mills in closed circuit with a hydrocyclone battery. A hydrocyclone is a mechanical device that will separate a slurry stream whereby the smaller particles will exit out the overflow line and the larger particles will exit out the underflow line. The overflow is sent to the flotation circuit and the underflow is sent back to the mill for further grinding. A collection of these devices is called a battery. A hydrocyclone will be sized based on the particular process requirements. The performance of the hydrocyclone is dependent on how well it is matched to the process conditions. Once the proper hydrocyclone has been chosen and installed, it must be operated within a specific range in order to maintain the proper split between the overflow and the underflow. The split is dependent on slurry feed density and volumetric flow into the device. A typical control system will use a combination of volumetric flow, feed density and pressure across the hydrocyclone to control the split. Because of the harsh environmental and process conditions all of these measurements suffer from maintenance and performance issues. This can result in reduced classification performance and reduced mill throughput. Flotation performance is highly dependent on the particle size distribution in the feed which comes from the battery overflow, thus it is dependent on the hydrocyclone classification performance. The mill throughput is highly dependent on the circulation load which comes from the battery underflow. Traditionally hydrocyclone performance has been determined by evaluating manually collected samples from the consolidated hydrocyclone battery overflow stream. This technique is time consuming; the accuracy is subject to sampling techniques; the sample is a summation of all the hydrocyclones from the battery; and has a typical 24 hour turnaround time. Therefore it is not possible to implement a real time control algorithm to monitor, control, and optimize the each individual hydrocyclone.

Real time monitoring of each individual hydrocyclone would provide the ability to track the performance of individual hydrocyclones. This would enable the following:
- The detection of hydrocyclones that require maintenance or have become plugged.
- The detection of operational performance instabilities that cause extended periods of roping or surging.
- The detection of chronic problems with certain hydrocyclones.
- Tighter classification control with changing throughput demands and feed densities.
- Increased up time or availability of the hydrocyclone battery.

Moreover, FIG. 6 shows a classification stage generally indicated as 10 that may form part of a mineral extraction processing system, like the one shown in FIGS. 5A and 5B for extracting minerals from ore. The classification stage 10 includes a hydrocyclone battery 12 that receives a feed from a grinding stage, as shown in FIG. 5B. The hydrocyclone battery 12 is configured to respond to signaling from a signal processor or processor control module 14, and provide an effluent, e.g., a fine slurry or slurry feed, to a flotation stage shown in FIG. 5B. The classification stage 10 also may include a hydrocyclone split 16 that receives the slurry from the hydrocyclone battery 12, and also may receive signaling from the signal processor or processor control module 14, and may provide some portion of the slurry back to the mill stage shown in FIG. 5B, and may also provide another portion of the slurry as a flotation feed to a flotation stage shown in FIG. 5B. The signal processor or processor control module 14 may also send to or receive from one or more signals, e.g. with a control room computer. The technique to track the flow performance of individual cyclones operating in parallel on a single battery is described in relation to the hydrocyclone battery 12 (i.e. the single battery), the signal processor or processor control module 14 and the cooperation of these two components.

Figure 7A:
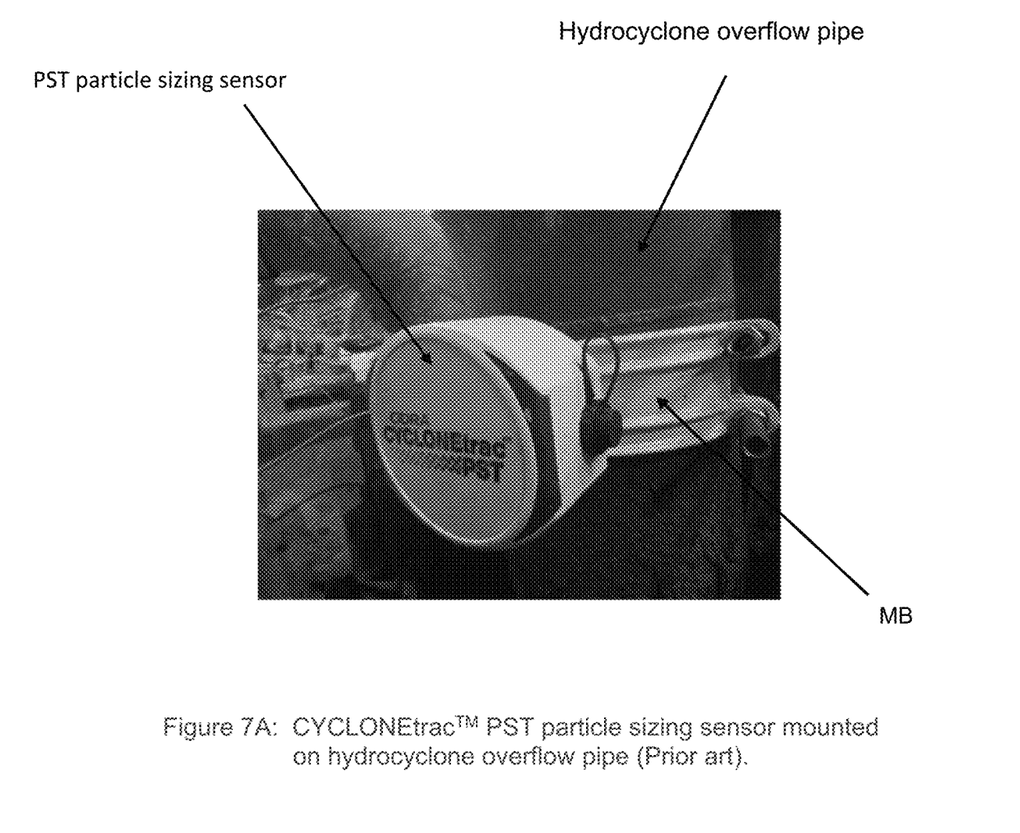
FIG. 7A is a photograph of a CYCLONEtrac™ PST particle sizing sensor mounted on a hydrocyclone overflow pipe, e.g., that is known in the art.
Figure 7B:
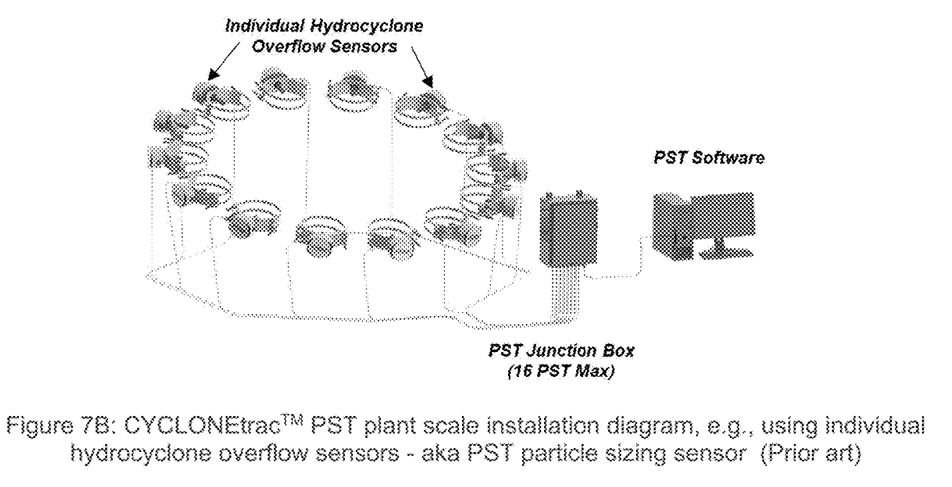
FIG. 7B: CYCLONEtrac™ PST plant scale installation diagram, e.g., using individual hydrocyclone overflow sensors (AKA PST particle sizing sensor), e.g., that is known in the art.

FIGS. 7A and 7B: The PST Particle Sizing Sensor

By way of example, FIG. 7A shows a PST particle sizing sensor mounted on a hydrocyclone overflow pipe; and FIG. 7B shows a PST plant scale installation diagram, e.g., using individual hydrocyclone overflow sensors (AKA PST particle sizing sensor). In FIGS. 7A and 7B, the PST particle sizing sensor includes a mounting bracket MB configured to arrange the PST particle sizing sensor on a hydrocyclone classifier overflow pipe of at least one hydrocyclone in a hydrocyclone battery.

In FIGS. 7A and 7B, the PST particle sizing sensor is the CYCLONEtrac™ PST particle sizing sensor, which was developed, manufactured and distributed by the assignee of the present invention. The PST particle sizing sensor is disclosed in the aforementioned PCT/US2014/012510 (WFMB no. 712-002.406-1//CCS-0120WO), as well as corresponding U.S. Ser. No. 14/762,223, and U.S. provisional application No. 61/755,305, which are all incorporated by reference in their entirety.

Although the present invention is disclosed using the assignee's CYCLONEtrac™ PST particle sizing sensor, embodiments are envisioned, and the scope of the invention is intended to include, e.g., using other types or kind of particle sizing sensor configured to be arranged on arranged on a hydrocyclone classifier overflow pipe of at least one hydrocyclone in a hydrocyclone battery that are both now known or later developed in the future within the spirit of the present invention.

Applications

By way of example, the present invention may be used in, or form part of, or used in conjunction with, industrial processes like a mineral extraction processing system for extracting or separating minerals in a fluidic medium that are either now known or later developed in the future, including any mineral process, such as those related to processing substances or compounds that result from inorganic processes of nature and/or that are mined from the ground, as well as including either other extraction processing systems or other industrial processes, where the extraction, or separating, or sorting, or classification, of product by size, or density, or some electrical characteristic, is critical to overall industrial process performance.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:
1. Apparatus, comprising:
a controller having a signal processor or processing module configured to:
receive signaling containing information about a relationship between multiple particle size measurements of different measured particles having different measured particle sizes flowing in a hydrocyclone classifier overflow stream sensed by at least one particle size measurement device arranged on a hydrocyclone classifier overflow pipe of at least one hydrocyclone in a hydrocyclone battery, and about a floatable fraction that defines a particle size range of different floatable particle sizes of different floatable particles that can be recovered by the at least one hydrocyclone in the hydrocyclone battery; and
determine corresponding signaling containing information to control a ground product size of ore having ground particles provided to the at least one hydrocyclone in the hydrocyclone battery, based upon the signaling received.

2. Apparatus according to claim 1, wherein the signal processor or processing module is configured to provide the corresponding signaling as control signaling to control a final ground particle size of the ore having the ground particles provided to the at least one hydrocyclone in the hydrocyclone battery.

3. Apparatus according to claim 1, wherein the apparatus comprises the at least one hydrocyclone in the hydrocyclone battery.

4. Apparatus according to claim 3, wherein the at least one hydrocyclone in the hydrocyclone battery comprises multiple hydrocyclones.

5. Apparatus according to claim 2, wherein the apparatus comprises a grinding and classification stage configured to grind and classify the ore into the ground particles having the final ground particle size for providing to the at least one hydrocyclone in the hydrocyclone battery.

6. Apparatus according to claim 5, wherein the grinding and classification stage is configured to receive the control signaling and grind and classify the ore into the ground particles having the final ground particle size using a real time automatic control.

7. Apparatus according to claim 1, wherein the floatable fraction is determined as a difference between a minimum floatable particle size and a maximum floatable particle size for the at least one hydrocyclone in the hydrocyclone battery.

8. Apparatus according to claim 7, wherein the relationship is a statistical relationship that depends on a percentage of the multiple particle size measurements that fall within the floatable fraction.

9. Apparatus according to claim 1, wherein the apparatus comprises the at least one particle size measurement device arranged on the hydrocyclone classifier overflow pipe of the at least one hydrocyclone in the hydrocyclone battery.

10. Apparatus according to claim 1, wherein the at least one particle size measurement device comprises multiple particle size measurement device arranged on the hydrocyclone classifier overflow pipe of the at least one hydrocyclone in the hydrocyclone battery.

11. Apparatus according to claim 1, wherein
the at least one hydrocyclone in the hydrocyclone battery comprises multiple hydrocyclones in the hydrocyclone battery; and
each of the multiple hydrocyclones includes a respective hydrocyclone classifier overflow pipe having a respective particle size measurement device arranged thereon.

12. Apparatus according to claim 1, wherein the apparatus comprises a mineral processing system having grinding and flotation stages or circuits.

13. Apparatus according to claim 12, wherein
the signal processor or processing module is configured to receive further signaling containing information about an objective function or algorithm to maximize a Net Metal Production (NMP) of the mineral processing system; and
the signal processor or processing module is configured to determine the corresponding signaling based upon the further signaling received.

14. Apparatus according to claim 13, wherein the objective function or algorithm is based upon a correlation between the relationship and the NMP of the mineral processing system.

15. Apparatus according to claim 14, wherein the apparatus comprises a memory having an objective function database configured to store a time-elapsed series of correlations between the relationship and the NMP of the mineral processing system.

16. Apparatus according to claim 14, wherein the signal processor or processing module is configured to implement the objective function or algorithm and change the floatable fraction, including the particle size range.

17. Apparatus according to claim 16, wherein the signal processor or processing module is configured to increase or decrease the particle size range of the floatable fraction.

18. Apparatus according to claim 14, wherein the apparatus comprises a memory having a floatable fraction database configured to store floatable fractions and corresponding NMPs of the mineral processing system.

19. A mineral processing system, comprising:
a grinding and classification stage configured to receive control signaling and grind and classify ore into ground particles having a ground particle size;
a hydrocyclone battery having at least one hydrocyclone with a hydrocyclone classifier overflow pipe, configured to receive the ground particles, and provide a hydrocyclone classifier overflow stream from the hydrocyclone classifier overflow pipe having overflow particles with different particle sizes;
at least one particle size measurement device arranged on the hydrocyclone classifier overflow pipe of the at least one hydrocyclone in the hydrocyclone battery, configured to sense different overflow particles having the different particle sizes flowing in the hydrocyclone classifier overflow stream, and provide particle size measurement signaling containing information about multiple particle size measurements of the different overflow particles having the different particle sizes flowing in the hydrocyclone classifier overflow stream; and
a controller having a signal processor or processing module configured to:
receive signaling containing information about a relationship between the multiple particle size measurements of the different overflow particles having the different particle sizes flowing in the hydrocyclone classifier overflow stream, and about a floatable fraction that defines a particle size range of different floatable particle sizes of different floatable particles that can be recovered by the at least one hydrocyclone in the hydrocyclone battery; and
provide the control signaling containing information to control the ground product size of the ground particles provided from the grinding and classification stage to the at least one hydrocyclone in the hydrocyclone battery, based upon the signaling received.

20. A mineral processing system according to claim 19, wherein the signaling includes the particle size measurement signaling sensed by the at least one particle size measurement device.

21. A mineral processing system according to claim 19, wherein
the signal processor or processing module is configured to receive further signaling containing information about an objective function or algorithm to maximize a Net Metal Production (NMP) of the mineral processing system; and
the signal processor or processing module is configured to determine the control signaling based upon the further signaling received.

* * * * *